Feb. 20, 1968 W. R. HUNT ETAL 3,369,638
CLUTCH MECHANISM FOR DUAL-INPUT, SINGLE-OUTPUT CONTROL SYSTEM
Filed March 21, 1966
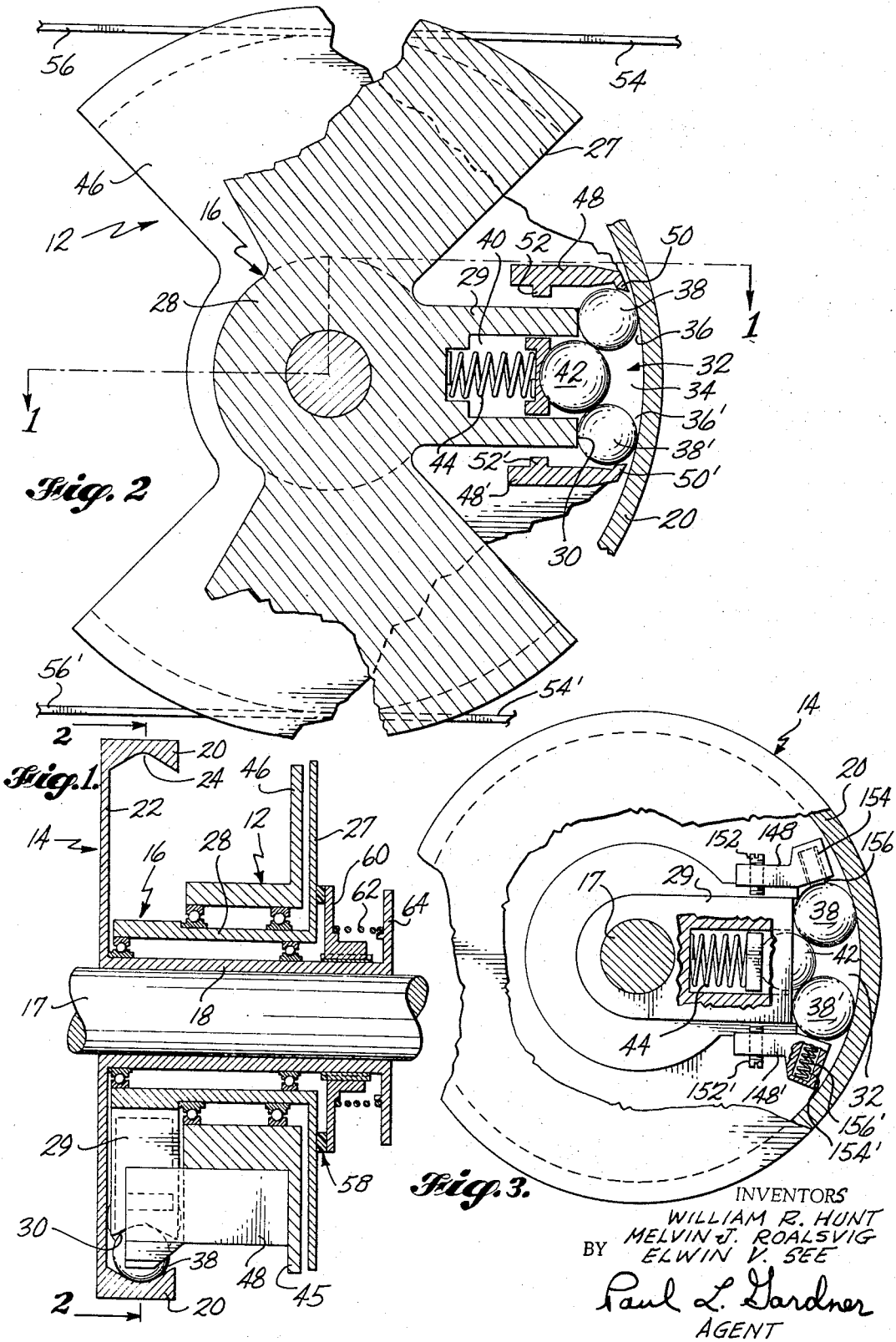
INVENTORS
WILLIAM R. HUNT
MELVIN J. ROALSVIG
ELWIN V. SEE
BY
Paul L. Gardner
AGENT United States Patent Office 3,369,638
Patented Feb. 20, 1968

3,369,638
CLUTCH MECHANISM FOR DUAL-INPUT,
SINGLE-OUTPUT CONTROL SYSTEM
William R. Hunt, Elwin V. See, and Melvin J. Roalsvig,
Seattle, Wash., assignors to The Boeing Company,
Seattle, Wash., a corporation of Delaware
Filed Mar. 21, 1966, Ser. No. 545,185
10 Claims. (Cl. 192—38)

The present invention relates generally to jamming type clutches. More specifically, the invention relates to an improved jamming type clutch mechanism particularly suitable for use in a control system having two power inputs and a single power output, such as a fuel control system for airplane engines.

The dual-input, single-output type of control system referred to above is ordinarily designed so that one of the power inputs, hereinafter referred to as the master power input member, may disengage and override the other power input, hereinafter referred to as the normal power input member. Thus, at any given time only one of the power input members will be transmitting torque to the power output member. Such a control system is commonly employed on airplanes to regulate the flow of fuel to the engines. The normal power input member may be operated by a suitable servomechanism, and the master power input member may be manually operated. The power output member is connected to a suitable throttle valve, the controlled element.

A control system of the type described above is shown, for example, in U.S. Patent No. 2,394,384 to Horstmann. In the Horstmann system the normal input member 5 is regulated by a servomotor and is ordinarily clutched to the output member 2 to control its output torque. The master input member 7 is regulated by a manually operable arrangement 31 and is adapted, when actuated, to declutch the output member from the normal input member and control the output torque of the former.

The clutch mechanism employed in the Hortsmann system is of the two-way jamming type; i.e., it is adapted to be employed to clutch the output member to either of the input members for rotation in either a clockwise or counterclockwise direction. The clutch includes a pair of clutch or jamming elements in the form of toggles 3, 4 which are spring-biased into jamming engagement between the output member and the circumferentially surrounding normal input member. One of the toggles is adapted to lock the output member and the normal input member together against relative rotational movement in on direction, and the other toggle is adapted to lock the members together against relative rotational movement in the opposite direction. A striker element 9 is provided on the master input member and extends between the toggles for selectively disengaging either toggle to disengage the output and normal input members and permit relative rotational movement therebetween when it is desired to control the output element manually.

The Horstmann clutch has not proven to be entirely satisfactory, however, for several reasons. When the normal input member is driving the output member in a given direction (clockwise or counterclockwise), one of the toggles is jammed against the inner peripheral wall of the normal input member. When the master input member is operated to rotate the output member in the opposite direction, the striker element will strike the jammed toggle to disengage or "unjam" it. Since the toggles are connected by a spring, however, the other toggle will be urged against the inner wall of the normal input member and will drag along this wall as the output and normal input members are driven in opposite directions. This obviously creates undesirable wear on both the toggle and the inner wall of the normal input member.

Another difficulty associated with this type of clutch arises when it is desired to employ the master (manual) input member to drive the output member in the same direction (but to a different extent) as the normal input member had been driving it. Under these circumstances the striker element will engage the non-jammed toggle, thus (because of the spring connection between the two toggles) tending to maintain the jammed toggle in jamming engagement with the normal input member. This obviously makes it difficult for the manual (master) power input member to move the output member in the same direction as the normal input member had been driving. In addition, since the normal input member is moving in the same direction as the master and output member, the normal input member will tend to "grab" the jammed toggle and create an undesirable "chattering."

Still another problem associated with the Horstmann type clutch arises when it is employed in a control system having a compliant transmission media, such as a cable, between the power output member and the element to be controlled. Such a cable 25 is shown, for example, in FIGURE 3, of the Horstmann patent between the power output member 2 and the element to be controlled 26. In order to insure that the full load is delivered to the controlled element (when such is desired), it is common in such systems to permit the manual or master input member (and, consequently, the power output member which it drives) to travel to a greater extent than is necessary to drive the controlled element to its travel limit, thereby stretching the cable. As the output and master input members "overtravel," however, the trailing jam toggle will (because of the spring connection between the two toggles) be pulled into jamming engagement with the inner peripheral wall of the normal input member. This makes it difficult to "unjam" or disengage the trailing toggle when it is later desired to drive the power output member and controlled element in the opposite direction.

A clutch arrangement of the general type described above has also been designed with roller units employed as the jam element, in place of toggles. Such a clutch is shown, for example, in Horstmann's U.S. Patent No. 2,365,877. This clutch includes a rotatable eccentric striker 27 for selectively urging either of the spring-biased roller units 10, 10' out of jamming engagement between the output member 4 and the normal input member 7. Continued rotation of the eccentric striker will then drive the output member in the desired direction.

This type of clutch mechanism does not overcome the aforementioned problems associated with the toggle-type jamming clutches, however. Thus, when the master input member (eccentric striker) of this clutch is operated to rotate the output member in either the same or opposite direction as the normal input member was rotating it, one of the spring-biased jamming rollers will be urged against the inner peripheral wall of the normal input member, thereby creating the undesirable drag forces and/or chattering. The aforementioned problems relating to overtravel of the master input and output members are also present where this type of clutch is employed because of the spring connection between the jam elements.

Accordingly, it is one of the objects of this invention to provide an improved clutch mechanism which overcomes the aforementioned difficulties and disadvantages associated with prior art jamming type clutches.

A more specific object of this invention is to provide a clutch mechanism for use in a dual-input, single-output type of control system which permits the master power input member to override the normal power input member and drive the output member in either the same or opposite direction as the normal input member was driving, without creating undesirable drag forces or chattering in the mechanism.

Still another object of this invention is to provide a dual jamming element type of clutch mechanism for use on a control system employing compliant transmission media, wherein the trailing jam element will not cause the clutch to jam when the output member "overtravels" the controlled element.

Another problem heretofore associated with the dual-input, single-output type control systems employing jamming type clutches arises particularly when the system is employed to control the supply of fuel to an engine. The engine tends to move the output element in a forward, or "increased thrust" direction, thereby tending to jam the non-driving jam element, and making it difficult to urge this element out of jamming engagement when it is desired to further increase engine thrust (increase fuel feed). This problem is commonly referred to as "stick slip."

Accordingly, it is a further object of this invention to provide a clutch mechanism for a dual-input, single-output control system which substantially eliminates the problem of "stick slip."

Briefly, the undesirable drag forces and chattering have been minimized in the clutch mechanism of the present invention by providing the output element with a radially outwardly extending flange element having a radially outwardly opening cavity therein. A compartment having substantially wedge-shaped side portions is defined by the outer end surface of the flange element and the inner peripheral wall of a ring-shaped portion on the normal input member, and a jamming element (preferably spherical) is provided in each of the wedge-shaped side portions. An actuator element (preferably spherical) is disposed in the cavity of the flange element and is normally spring-biased toward the jamming balls to jam the balls into the wedge-shaped side portions between the flange element of the output member and the ring-shaped portion of the normal input member to clutch these members for rotational movement. A manually operable master input member is disposed adjacent to the output member and includes a pair of unlock pawls disposed on either side of the flange element adjacent the wedge-shaped portions of the compartment for selectively disengaging, unlocking or unjamming one of the balls when it is desired to manually drive the output member. The disengaging or "unjamming" of the selected ball will urge the actuator ball into the cavity of the output member flange element to thereby release the frictional drag on the other ball. Since both balls are unlocked when the master control element is driving the output member, neither ball will cause the clutch mechanism to jam when the master input member causes the output member to "overtravel" the controlled element.

The problem of "stick slip" has been overcome in the mechanism of this invention by placing a friction disc between the normal input member and the output member to create a drag load greater than the overrunning load which the engine would otherwise tend to place on the output member.

The foregoing and other objects, features and advantages of the invention will be apparent from the following description of preferred embodiments of the invention as illustrated in the accompanying drawings.

In the drawings:

FIGURE 1 is a longitudinal section view of a clutch mechanism constructed in accordance with the teachings of the present invention;

FIGURE 2 is a section view of the clutch mechanism of FIGURE 1 taken along the line 2—2 thereof, with parts broken away for clarity; and FIGURE 3 is an elevation view, with parts broken away for clarity, of a modified form of a clutch mechanism constructed in accordance with the teachings of the invention.

Referring now to the embodiment disclosed in FIGURES 1 and 2, the clutch mechanism comprises a master power input member 12, a normal power input member 14, a power output member 16 and clutch means disposed between the output and the normal input members. The members are rotatably mounted about a stationary shaft 17.

The normal power input member 14 includes an axially extending portion 18 and a substantially ring-shaped element 20 spaced radially outwardly therefrom. The axially extending portion 18 and the ring element 20 are connected by an annular plate 22, and the ring element 20 includes means defining a ball race 24 on its inner peripheral wall. The normal power input member 14 is connected to and controlled by a suitable servomechanism (not shown).

The output member 16 includes a quadrant 27 having an axially extending portion 28 with a flange element 29 integrally attached thereto. The flange element 29 extends radially outwardly and terminates at an outer end surface 30 facing the inner peripheral wall 24 of the ring element 20 and radially spaced inwardly therefrom. The inner peripheral wall 24 of the ring element 20 and the outer end surface 30 of the output element flange member 28 define a compartment 32 having a center portion 34 and substantially wedge-shaped side portions 36, 36'. Disposed within this compartment 32 are jam elements 38, 38', which are shown in the form of balls having a maximum diameter greater than the distance between the outer peripheral edge of the outer end surface 30 of the flange element 29 and the inner peripheral wall 24 of the ring element 20. Thus, the balls 38, 38' will be confined in the compartment 32, but free to move toward the center portion 34 thereof.

The flange element 29 further includes means defining a radially outwardly opening cavity 40 therein. An actuator element in the form of a ball 42 is disposed in the cavity 40 and is urged out of the cavity toward the compartment 32 by means of a spring 44 disposed between the bottom of the cavity and the actuator ball. Thus, the spring 44 normally tends to force the actuator ball 42 between the jam balls 38, 38' in the compartment 32 to thereby urge the balls into the wedge-shaped side portions 36, 36'.

The master power input member 12 includes a quadrant 46 and an axially extending hub 47 disposed adjacent to the output member quadrant 27. Disposed on the face 45 of the master quadrant 46 which faces the output flange element 29 are a pair of unlock or declutching fingers or pawls 48, 48'. These unlock pawls are circumferentially spaced on the master quadrant 46 so that one is disposed on either side of the output flange element 29, and each pawl includes a curved, extended portion 50 or 50' adjacent its respective engage ball 36 or 36'. The unlock pawls 48, 48' further include abutments 52, 52' which face the flange element 29 and abut the same when the master power input member 12 is actuated to control the output member in a manner more fully described hereinafter.

The outer periphery of the output member 16 may be attached to any mechanism to be controlled, such as an engine throttle (not shown), by any suitable means, such as cables 54 (FIGURE 2). Similarly, any suitable means, such as cables 56 (FIGURE 2), may be employed to connect the master input member 12 to a manually operable control device (not shown).

In operation, under normal conditions the normal power input member 14 will be driven in either a clockwise or counterclockwise direction by a suitable servomechanism (not shown). As the normal input member 14 is rotated, one of the engage balls 38 or 38' will tend to ride off of the outer end surface 30 of the flange element 29; but since the ball diameter is greater than the distance between the outer peripheral edge of the flange surface 30 and the ring inner wall 24, the ball will jam therebetween in its associated wedge-shaped side portion 36 or 36'. This will clutch the output and normal input members together for rotational movement.

When it is desired to override the control of the normal power input member 14, the master input quadrant 46 is manipulated (via cables 56, 56') in the desired direction. If, for example, the normal power input member has been rotating the output member in a counterclockwise direction (as viewed in FIGURE 2) and it is desired to manually drive the output member in a clockwise direction, the master input quadrant 46 is rotated in a clockwise direction. Initially, this will bring the extended end portion 50 of unlock pawl 48 into engagement with the jammed ball 38; and continued rotation of the master quadrant 46 will cause the unlock pawl 48 to disengage or "unjam" the jammed ball 38 and urge it toward the center portion 34 of the compartment 32. This will disengage the ring element 20 of the normal input member 14 and the flange element 29 of the output member 16 to permit relative rotational movement therebetween. It will also cause the actuator ball 42 to be urged radially inwardly into the cavity 40 of flange element 29 against the action of spring 44. As a result, the force tending to urge the other engage ball 38 against the inner wall 24 of ring element 20 will be relieved, and substantially no frictional drag forces will be exerted on the ball 38', ring element wall 24 or flange outer surface 30. Continued rotation of the master quadrant 46 will bring the abutment 52 of pawl 48 into engagement with the flange element 29 to rotate the flange element and attached output member 16 with the master input member 12.

As can readily be seen from the foregoing, the clutch arrangement described above permits the master power input member 12 to take control of the output element 16 without creating undesirable drag forces on any of the parts of the mechanism. Moreover, this result is attained regardless of the direction in which the normal power input member 14 is rotating or the direction in which the manual (master) input member 12 is rotated. This is so because one of the unlock pawls, 48, or 48', will disengage its associated jam ball, 38 or 38', when the master input element is rotated (regardless of direction) and thereby depress the actuator ball 42 to release the outward force on the other jam ball.

Thus, for example, if the normal input member 14 is rotating in a clockwise direction (as viewed in FIGURE 2), and the master quadrant 46 is also rotated in a clockwise direction, the unlock pawl 48 will depress jam ball 38 against actuator ball 42 to drive the ball 42 into the cavity 40, against the force of the spring 44, and release the outward pressure on the jam ball 38'. The jam ball 38 will then be free to rotate independently in the compartment 32. This will obviously minimize undesirable drag on the balls, ring elment 20 and flange 29 and will also substantially eliminate "chattering."

The clutch mechanism shown in FIGURES 1 and 2 also includes structure for preventing "stick slip." As briefly mentioned earlier in the specification, "stick slip" is a phenomenon which occurs when the engine (to which the output member 16 is connected) tends to drive the output member in a forward or increased thrust direction. For example, assuming that clockwise rotation (as viewed in FIGURE 2) of the output member 16 will increase the engine speed, the engine (not shown) will tend to move the output member 16 clockwise to thereby jam the "nondriving" engage ball 38 between the ring 20 and the flange 29. When it is desired to override the control of the normal input member 14 and rotate the master input member 12 in a clockwise direction, it is diffcult to disengage the jam ball 38 and permit the master input member 12 to be rotated in the clockwise direction; and the master input "stick" will slip.

It has been found that this "stick slip" problem can be eliminated by providing a drag load between the normal power input member 14 and the output member 16 which is greater than the overrunning force which the engine tends to create. This drag load may be created by placing an annular friction ring 58 (see FIGURE 1) between the normal input member and the output member. More specifically, the ring is placed between the quadrant 27 of the output member 16 and an annular hub 60 splined on the axially extending portion 18 of the normal input member 14, A spring 62 disposed between the hub 60 and a radially outwardly extending flange 64 on the axial portion 18 of the normal input member may be conveniently employed to create a suitable drag load on the members.

For most effective results, the clutch mechanism should be oriented so that gravity will not tend to cause the trailing ball to jam between the output and normal input members when the master input member is operated. If the clutch were in the position shown in FIGURE 1, for example, and the master input member 12 were rotated in a clockwise direction, gravity would tend to maintain ball 38' (the trailing ball) jammed in the wedge-shaped portion 36' of the compartment 32. If the master input member is rotated in a clockwise direction, however, pawl 48' will force ball 38' against ball 42, and gravity will tend to pull ball 38 (the trailing ball) out of the wedge-shaped portion 36. Hence, the position of the output member 16 in FIGURE 2 should be its limit of rotation in a clockwise direction; and its limit of rotation in a counterclockwise direction should be 180 degrees from its FIGURE 2 position.

The clutch mechanism disclosed in FIGURE 3 is designed so that gravitational forces will not affect its operation. The leading ends of the unlock pawls 148, 148' in this embodiment are provided with cavities 154, 154' for containing coil springs 156, 156'. These springs are relatively small and weaker than spring 44. Hence, under normal operating conditions the spring 44 will urge the actuator ball 42 against the jam balls 38, 38', thereby depressing springs 156, 156'. When, however, the master input member and its attached unlock pawls are operated to drive one of the jam balls inwardly into compartment 32, the actuator ball 42 will depress spring 44, and the other jam ball will be held out of jamming engagement between the ring 20 and the flange 29 by its associated coil spring 156 or 156'. Thus, each of these springs will prevent gravity from causing its associated ball to jam, and it is not necessary to orient the clutch mechanism to compensate for gravitational forces.

The clutch mechanism of FIGURE 3 differs from the one disclosed in FIGURES 1 and 2 in one other respect. The unlock pawls 148, 148' are provided with adjustable stop screws 152, 152' in place of the fixed abutments 52, 52' of the FIGURES 1 and 2 embodiment.

As can be seen from the foregoing, the clutch mechanisms of this invention, when employed in a dual-input, single-output type of control system, will permit the master power input member to override the normal power input without creating undesirable drag forces or chattering in the mechanism. In addition, the novel arrangement described will substantially eliminate the problem of "stick slip."

While the invention has been shown and described with reference to preferred embodiments thereof, it will be understood by those skilled in the art that various changes in form and details may be made therein without departing from the spirit and scope of the invention. For example, the actuator and jamming elements could be made in any suitable shape, such as cylinders, the only critical factor being that the greatest cross-sectional diameter of the jamming elements must be greater than the distance between the outer peripheral edge of the flange element outer face and the inner peripheral wall of the ring element.

What is claimed is:

1. A clutch mechanism comprising:
a ring element having an inner peripheral wall;
flange means mounted within the confines of said inner peripheral wall of said ring element and including an outer end surface facing said inner wall of said ring member;
said outer end surface of said flange means and said inner peripheral wall of said ring element defining a compartment therebetween having substantially wedge-shaped side portions;
a pair of jamming elements, disposed in said compartment; each of said jamming elements being disposed adjacent to one of said wedge-shaped side portions of said compartment;
spring-biased actuator means disposed in said compartment between said jamming elements for urging said jamming elements into their respective wedge-shaped side portions; and
a pair of unlock elements associated with said jamming elements; each of said unlock elements being disposed adjacent to one of said wedge-shaped side portions of said compartment for selectively urging its associated jamming element out of its respective wedge-shaped side portion to unlock said ring element and said flange means and permit relative rotational movement therebetween;
whereby, when one of said unlock elements is moved to urge its associated jamming element out of its respective wedge-shaped side portion, said spring-biased actuator means will be depressed to relieve the pressure on the other of said jamming elements and permit said other jamming element to spin freely in said compartment.

2. A clutch mechanism according to claim 1, wherein said flange means includes means defining a cavity in its outer end surface facing said inner wall of said ring element and wherein said spring-biased actuator means includes an actuator element which is circular in cross-section and is at least partially disposed in said cavity, and spring means disposed in said cavity between said actuator element and the bottom of said cavity for urging a portion of said actuator element out of said cavity and between said jamming elements.

3. A clutch mechanism according to claim 2, wherein said outer end surface of said flange means includes an outer peripheral edge, and wherein said jamming elements are circular in cross-section; the greatest cross-sectional diameter of said jamming elements being greater than the distance between said outer peripheral edge of said flange means outer end surface and the inner peripheral wall of said ring element.

4. A clutch mechanism according to claim 3, wherein said actuator element and said jamming elements are in the form of balls, and wherein said inner peripheral wall of said ring element is provided with means defining a ball race for receiving said jamming balls.

5. A clutch mechanism according to claim 1, wherein each of said unlock elements is provided with means defining a cavity therein facing its associated wedge-shaped compartment side portion; and further including spring means disposed in each of said unlock element cavities for biasing its respective jamming element out of its associated wedge-shaped compartment portion.

6. A clutch mechanism for use in a dual-input, single-output type control system having a rotatably mounted power output member, a rotatably mounted normal power input member and a rotatably mounted master power input member; said clutch mechanism comprising:
a circumferential ring element attached to said normal power input member; said ring element including means defining an inner peripheral wall;
a radially outwardly extending flange element attached to said power output member; said flange element including an outer end surface facing said inner peripheral wall of said ring element; said outer end surface having an outer peripheral edge;
said outer end surface of said flange element and said inner peripheral wall of said ring element defining a compartment therebetween having a center portion and substantially wedge-shaped side portions between said outer peripheral edge of said flange element end surface and said inner peripheral wall of said ring element;
a pair of jamming elements disposed in said compartment, one adjacent each of said wedge-shaped side portions;
spring-biased actuator means disposed in said compartment between said jamming elements for urging said jamming elements into their respective wedge-shaped side portions; and
a pair of unlock pawls attached to said master power input member and disposed on either side of said flange element adjacent to said wedge-shaped side portions of said compartment for selectively urging the jamming elements out of the wedge-shaped side portions of said compartment and toward the compartment center portion;
whereby, when said master power input member and its attached unlock pawls are rotated, one of said pawls will move one of said jamming members out of jamming engagement in its wedge-shaped compartment side portion, thereby depressing said spring-biased actuator means and relieving the drag pressure on the other of said jamming elements.

7. A clutch mechanism according to claim 6, wherein said flange element includes means defining a cavity in its outer end surface facing said inner wall of said ring element; and wherein said spring-biased actuator means includes an actuator element which is circular in cross-section and is at least partially disposed in said cavity, and spring means disposed in said cavity between said actuator element and the bottom of said cavity for urging a portion of said actuator element out of said cavity and between said jamming elements.

8. A clutch mechanism according to claim 7, wherein said jamming elements are in the form of balls having a diameter which is greater than the distance between said outer peripheral edge of said flange element outer end surface and the inner peripheral wall of said ring element.

9. A clutch mechanism according to claim 6, wherein each of said unlock pawls is provided with means defining a cavity therein adjacent its associated wedge-shaped compartment side portion; and further including spring means disposed in each of said unlock pawl cavities for biasing its respective jamming element out of its associated wedge-shaped compartment portion.

10. A clutch mechanism according to claim 6, and further including friction means disposed between said normal input member and said output member for creating a drag load on said output member.

References Cited

UNITED STATES PATENTS

| | | | |
|---|---|---|---|
| 2,103,781 | 12/1937 | Hanson | 192—44 |
| 2,583,544 | 1/1952 | Burdick | 192—44 |

FRED C. MATTERN, Jr., *Primary Examiner.*

W. S. RATLIFF, *Assistant Examiner.*